US008176789B1

(12) United States Patent
Hickling

(10) Patent No.: US 8,176,789 B1
(45) Date of Patent: May 15, 2012

(54) THREE-MICROPHONE SOUND-INTENSITY PROBE

(76) Inventor: Robert Hickling, Huntington Woods, MI (US)

( * ) Notice: Subject to any disclaimer, the term of this patent is extended or adjusted under 35 U.S.C. 154(b) by 0 days.

(21) Appl. No.: 13/199,704

(22) Filed: Sep. 7, 2011

(51) Int. Cl.
*G01C 3/08* (2006.01)

(52) U.S. Cl. ........................................................ 73/646

(58) Field of Classification Search .................... 73/646, 73/645, 647, 648, 659; 381/91, 92, 122, 381/111-115, 355, 356, 357, 358, 361
See application file for complete search history.

(56) References Cited

U.S. PATENT DOCUMENTS

| | | | | |
|---|---|---|---|---|
| 4,236,040 | A * | 11/1980 | Chung | 73/646 |
| 7,526,094 | B2 * | 4/2009 | Hickling | 381/91 |
| 2011/0164760 | A1 * | 7/2011 | Horibe et al. | 381/92 |

OTHER PUBLICATIONS

J. Y, Chung, "Cross-spectral method of measuring sound intensity . . . ", J. Acoust. Soc. Amer., 64, 4, pp. 1613-1616, (1978).
Anon. "Sound-Intensity Probe Kit" p. 31, Product Catalog, Bruel & Kjaer, (2011).
Anon. "Intensity Probes", p. 15, Product Catalog, GRAS, (2011).
M. J. Crocker and F. Jacobsen, Figure 7, p. 1862, Chapt.136, vol. 4, +Encyclopedia of Acoutics, (John Wiley & Sons, New York, 1997).
Anon., "Sound-Intensity Probe", Slide 6, Salesperson's power-point description of Microflown probe, (2011).
J. D. Maynard, E.G. Williams and Y. Lee, "Nearfield acoustic holography 1. Theory of generalized holography and development of NAH", J. Acoust, Soc. Amer, 78, 4, 1395(1985).

* cited by examiner

*Primary Examiner* — Hezron E Williams
*Assistant Examiner* — Jamar Ray

(57) ABSTRACT

Method and apparatus for measuring sound intensity emitted by a vibrating surface (10). The apparatus includes a probe (25) with three miniature microphones in the side-by-side arrangement, attached to a straight supporting tube (23). The three microphones are matched in phase and amplitude and form a geometric straight line. The supporting tube (23) with the geometric straight line of microphones is positioned perpendicularly close to the vibrating surface (10). The geometric straight line of microphones can be extended to intersect the vibrating surface at the measurement point (30). The microphones are supported at the ends of narrow tubes (22) attached perpendicularly to the supporting tube (23). The tubes contain wires from the microphones that are collected inside the supporting tube (23) and connected to the instrumentation (100). The sign of computed sound-intensity spectra and sound intensity indicates the direction of sound-intensity flow at the vibrating surface.

11 Claims, 4 Drawing Sheets

INVENTION

THREE-MICROPHONE SOUND-INTENSITY PROBE

TECHNICAL FIELD

This invention relates to an apparatus and method for measuring the flow of sound intensity at a vibrating surface.

BACKGROUND OF THE INVENTION

Sound intensity is the time-average flow of sound power, per unit area, in the direction of sound propagation. It is generally measured in watts per square meter using the cross-spectral relation, which is the imaginary part of the cross spectrum of the sound pressure between a pair of closely-spaced microphones. This relation was discovered by 1. J. Y. Chung, "Cross-spectral method of measuring acoustic intensity without error caused by instrument phase mismatch", Journal of the Acoustical Society of America, Vol. 64, NO. 4, pp 1613-1616, (1978).

It is based on finite-element approximations that are valid when the spacing between a pair of microphones is less than the wavelength being measured, divided by 2π. The pair of microphones can either be in the side-by-side or face-to-face arrangement with the direction of the measurement along the line joining the geometric centers of the microphone faces. The measurement point is midway between the microphones.

In prior art, the probes are mainly of two types. One type consists of two microphones in the face-to-face arrangement. The other type consists of a single miniature microphone and two hot-wire anemometers. The present invention has three miniature microphones in a geometric straight line, in the side-by-side arrangement.

In the first type of probe in prior art, with two microphones in the face-to-face arrangement, the microphones are held together by a U-shaped structure. Generally the microphones are larger (diam. typically 12.7 mm) than in the present invention (diam. about 2.6 mm). Examples of such two-microphone probes are:

2. Sound Intensity Probe Kit—Page 31, Product Catalog, Bruel & Kjaer, Headquartered at DK-2850, Naerum, Denmark (2011).
3. Intensity Probes—Page 15, Product Catalog, GRAS, Headquartered at Skovlytoften 33, 2840 Holte, Denmark (2011).

Different sizes of spacers between the two microphones are used to cover different frequency ranges in the measurement. Compared to the invention, this type of probe appears to have four possible drawbacks: (a) the U-shaped structure supporting the microphones prevents the probe from being held close to a vibrating surface; (b) it can be difficult to align the probe perpendicularly to a vibrating surface; (c) the position of the measurement point on the vibrating surface may not be accurately determined; and (d) the spacers have to be changed by hand.

Both the face-to-face and side-by-side arrangements of the microphones have to meet two conditions for the microphone spacing. First, as indicated by J. Y. Chung in reference 1 above, the cross-spectral relation requires the spacing to be less than the wavelength being measured, divided by 2π. When this condition is not met, measurement error can result, as shown in 4. M. J. Crocker and F. Jacobsen, "Sound Intensity", FIG. 7, Page 1862 Chapter 156, Volume 4, of "Encyclopedia of Acoustics" edited by M. J. Crocker, (John Wiley & Sons, New York, 1997).

Measurement error also results when there is phase mismatch between the microphones. This can be avoided or reduced, either by matching microphones, or by using a correction technique developed by J. Y. Chung in reference 1, based on switching the positions of the microphones.

The second type of probe in prior art has a single microphone that measures sound pressure combined with two hot-wire anemometers that measure sound particle velocity. Sound intensity is the product of the two measurements. Usually the purpose of a hot-wire anemometer is to measure gas flow. This second type of probe is manufactured by Microflown Technologies, headquarted at Zevenaar, Holland, and is described, for example, in 5. Sound-Intensity Probe, Slide 6 of salesperson's power-point description of the Microflown probe, (2011).

A possible drawback with this type of probe is the interference with the hot-wire measurements that can occur when there are stray gas currents near operating machinery, or from wind gusts in the open. Another possible drawback is that an extension of the geometric straight line between the hot wires may not accurately determine the measurement point on a vibrating surface.

In the three-microphone probe of the present invention, the microphones can be matched and calibrated using the method described in 6. R. Hickling, "Normalization and Calibration of Microphones in Sound-Intensity Probes", U.S. Pat. No. 7,526,094, Apr. 28, (2009).

The matching and calibration are performed, using transfer functions, over the entire frequency range of the sound-intensity measurement. In prior art, it is often assumed that the microphone response is substantially uniform and hence that calibration need only be performed at a single frequency. Additionally, in the three-microphone probe of the present invention, the geometric line formed by the three microphones can be extended to accurately determine the position of the measurement point on the vibrating surface.

Finally, there is another method in prior art in which sound intensity is determined using an array of microphones near a vibrating surface. Sound intensity at the vibrating surface is calculated from sound pressure measured by the microphones in the array, using a mathematical procedure called nearfield acoustical holography (NAH), described in 7. J. D. Maynard, E. G. Williams and Y. Lee, "Nearfield acoustic holography. I. Theory of generalized holography and the development of NAH". Journal of the Acoustical Society of America, Vol. 78, No. 4, pp 1395-1413, (1985).

The drawbacks of this method are: (a) the difficulty of positioning an array of microphones near a complex vibrating surface and (b) possible error due to the approximations in the NAH calculations. Also the spacing of the microphones in the array may not accurately locate the peaks and valleys of the sound intensity at the vibrating surface.

SUMMARY OF THE INVENTION

The present invention relates to an apparatus and method for measuring the sound intensity emitted by a vibrating surface. It comprises a probe with three microphones attached in a straight line that is parallel to the axis of a straight supporting tube. The straight line of microphones and the supporting tube are held perpendicularly to the vibrating surface. The geometric line formed by the three microphones can be extended to indicate the position of the measurement point on the vibrating surface. The three microphones are supported at the ends of relatively narrow tubes that protrude perpendicularly an equal distance from the side of the supporting tube. Wires from the microphones pass through the narrow tubes into the supporting tube and thence to instrumentation that includes a computer. The computer uses the cross-spectral formulation to calculate sound intensity from the sound pressure measured by the microphones. The straight line of microphones are in the side-by-side arrangement and can be labeled respectively using the numbers 1, 2 and 3, starting near the tip of the supporting tube next to the vibrating surface and moving upwards away from the surface. In the invention, sound intensity is determined using the pair of microphones 1 and 2 and the pair of microphones 1 and 3. The remaining pair 2 and 3 can usually be ignored because it is furthest from the vibrating surface. The spacing between the microphones in a pair determines the frequency range of the measurement. Switching back and forth between the pair 1 and 2 and the pair 1 and 3 can be performed electronically and operated either by the handler of the probe or the computer.

The microphones 1, 2 and 3 are matched in amplitude and phase using the transfer-function methods described in Reference 6. Sound-pressure measurements, sound-intensity spectra and sound intensity are displayed on a computer screen or other device. Sound intensity is computed from the sound-intensity spectrum by integrating with respect to frequency. The sign of the sound-intensity spectrum and of sound intensity determines the direction of sound-intensity flow at a vibrating surface. Positive indicates flow out of the surface and negative indicates flow into the surface.

DESCRIPTION OF THE PREFERRED EMBODIMENT

Figures 1A, 1B, 1C:
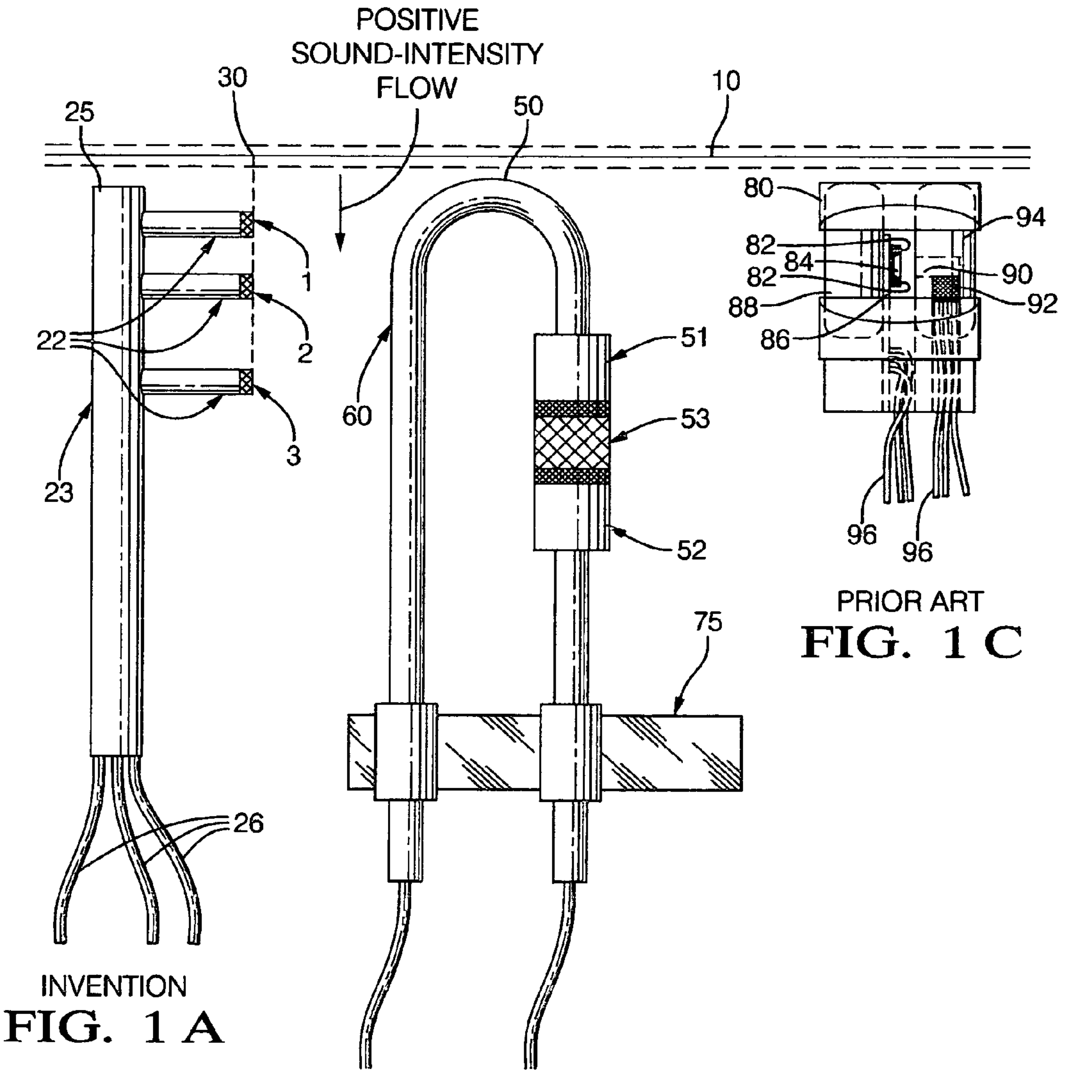
FIG. 1 A PRIOR ART
FIG. 1 B PRIOR ART
FIG. 1 is a comparison between the probe of the present invention (FIG. 1A) and two examples of prior art (FIGS. 1B and 1C), one example having two microphones in the face-to-face arrangement (FIG. 1B) and the other example having a single microphone and two hot-wire anemometers (FIG. 1C).

FIG. 1 shows a comparison between (a) the three-microphone sound-intensity probe 25 of the present invention and (b) the probe 50 and (c) the probe 80, of prior art. Probe 50 of prior art has a pair of relatively large microphones 51 and 52 (diam. typically 12.7 mm) in the face-to-face arrangement, held in place by a U-shaped structure 60, strengthened by a cross member 75. The cross member 75 can be adjusted to vary the spacing between the microphones using different spacers 53. When making a measurement, the microphone faces are assumed to be parallel to the vibrating surface 10. Both the probe 25 of the invention and the probe 50 of prior art calculate sound intensity using the cross-spectral relation of Reference 1.

The other probe 80 of the prior art consists of two hot-wire anemometers 82 and a miniature microphone 92 at the end of a sound-pressure inlet 90. The hot wires measure the particle velocity of sound and the microphone measures sound pressure. These two measurements are multiplied together to give sound intensity.

The three microphones of the invention in FIG. 1(*a*) are in the side-by-side arrangement and have a relatively small diameter, typically about 2.6 mm. The microphones are attached to the side of a straight supporting tube in a line that is parallel to the axis of the supporting tube. The straight supporting tube and the geometric straight line of microphones are perpendicular to the vibrating surface 10. The geometric line of the three microphones can be extended to indicate the location of the measurement point 30 on the vibrating surface.

Knowledge of the inter-microphone spacing is required for computation of sound intensity using the cross-spectral relation. The smallness of the microphones in the present invention makes it possible to know the inter-microphone spacing accurately, based on the geometric centers of the microphones, because there is little difference between the known position of the geometric center and the unknown position of the center of sensitivity of each microphone. Suitable miniature microphones are type FG-3329-PO7 supplied by Knowles Acoustics. These have a sensitivity of about 22 mV/Pa that is substantially flat up to about 10 kHz, which is about twice the sensitivity of the microphones used in probes 50, described in References 2 and 3. The side-by-side arrangement of the microphones in the probe of the invention 25 makes it possible to make measurements with different pairs of microphones having different spacings, without using solid spacers of the type 53. The numbers 1, 2 and 3, are used to label the different microphones, starting from the microphone closest to the vibrating surface and moving outward away from the surface. Two spacings can be used for the sound-pressure measurements: (a) between the pair of microphones 1 and 2 and (b) between the pair of microphones 1 and 3. The remaining spacing between the pair of microphones 2 and 3 could be used, but is neglected in the preferred embodiment because it is furthest from the vibrating surface and because the size of the spacing may not be useful for making additional sound-intensity measurements. The probe of the invention can make measurements that are closer to the vibrating surface 10 than the U-shaped probe of prior art in FIG. 1(*b*). The microphones 1, 2 and 3 in FIG. 1(*a*) are positioned at the ends of short narrow tubes 22 attached perpendicularly to the side of the straight supporting tube 23. The short tubes 22 contain the electrical wires from each microphone. Electrical wires 26 from the three microphones are combined inside the supporting tube 23 and connected to the instrumentation 100, as shown in FIG. 2.

Figure 2:
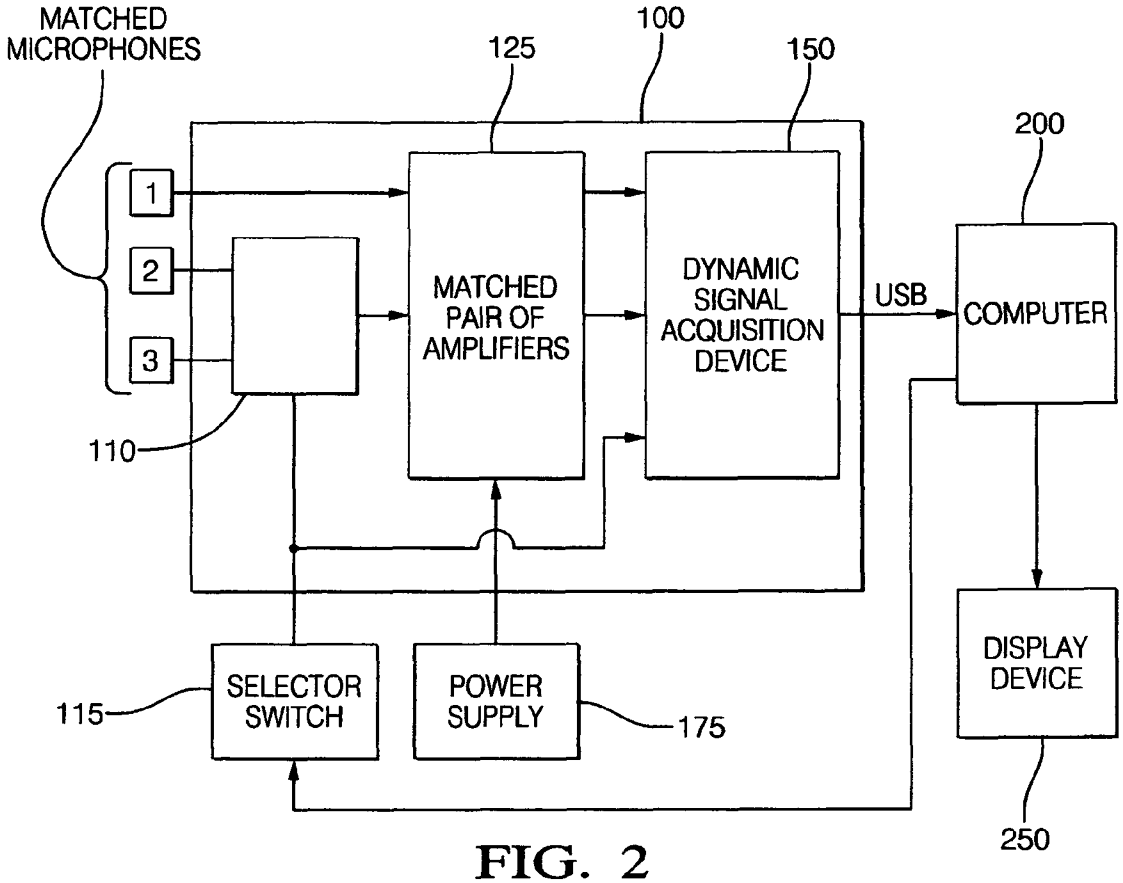
FIG. 2 is a block diagram of the three-microphone system of the present invention.

FIG. 2 is a schematic representation of the measurement instrumentation 100 of the present invention. Microphones 1, 2 and 3 are matched in amplitude and phase using the procedure described in Reference 6. A selector switch 115 can switch back and forth between the pair 1 and 2 and the pair 1 and 3. Either the probe handler or the computer 200 can also operate the switch. Unit 125 amplifies the sound-pressure measurements made by the microphone pairs 1 and 2 and 1 and 3.

Figure 3:
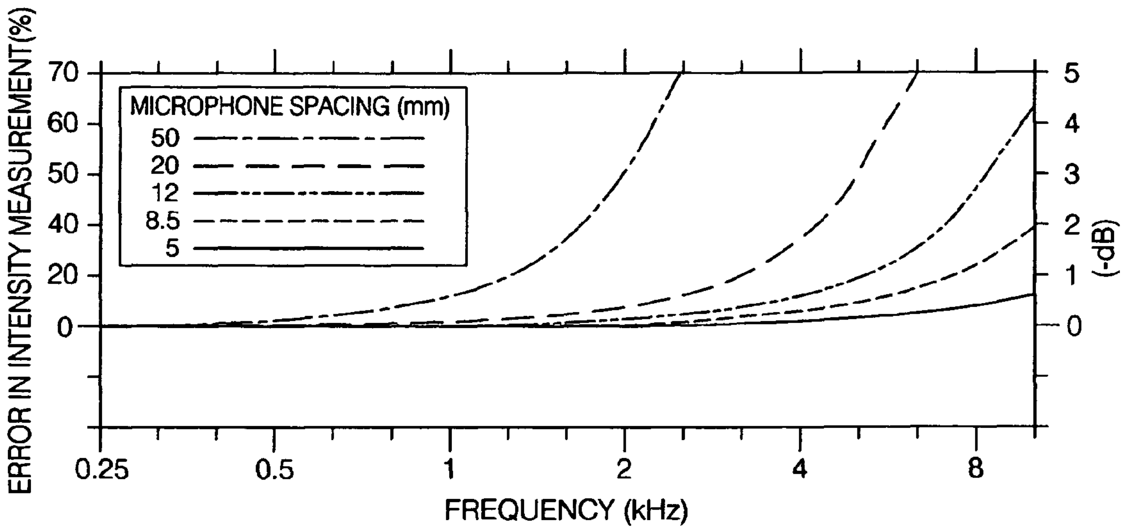
FIG. 3 is a figure, derived from Reference 4, showing the error in sound-intensity measurement, as a function of frequency that can occur for five different spacings in millimeters between a pair of microphones.

FIG. 3 shows the error in sound intensity for different microphone spacings in millimeters, as a function of frequency. For best results in practice, a spacing of 5 mm could be used between the pair of microphones 1 and 2 and a spacing of 12 mm could be used between the pair of microphones 1 and 3. The resulting spacing of 7 mm between microphones 2 and 3 is close to 5 mm, which would not be particularly useful for determining sound intensity in the preferred embodiment. The microphones and the amplifier 125 can be powered by a 9 Volt DC supply 175. From the amplifier 125 the measurements are then conducted through the two channels of a data-acquisition device 150. Such a device can be the NI-9233 module, supplied by the National Instruments Company. The measurements are then conducted through a USB (Universal Serial Bus) to the computer 200, where the sound intensity is computed, using the cross-spectral relation described in Reference 1. Sound-pressure measurements by a pair of microphones and the corresponding sound intensity spectrum can be displayed using the device 250.

Figure 4A:
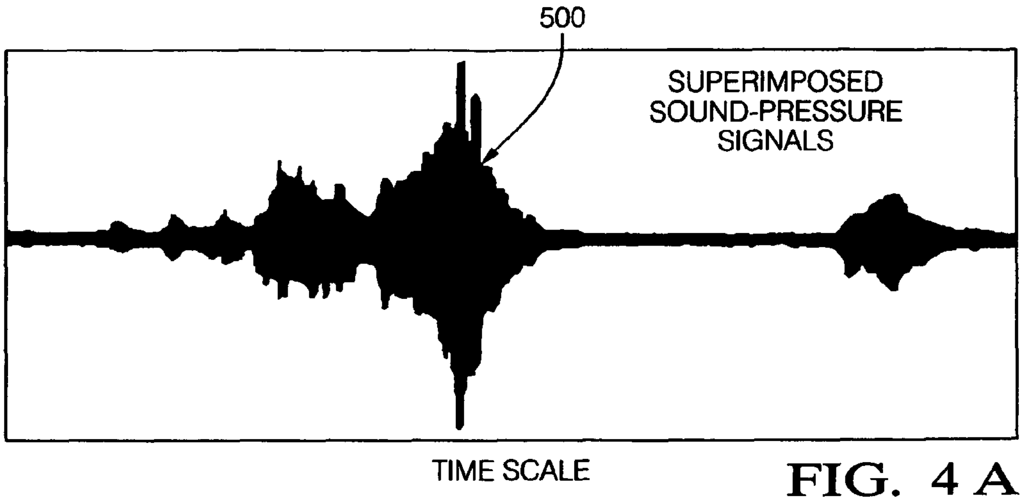
FIG. 4 is an illustration showing two superimposed sound-pressure pulses measured with a pair of microphones, together with the corresponding sound-intensity spectrum, which in FIG. 4(*b*) is positive when the probe of the invention points towards a sound source and in FIG. 4(*c*) is negative when the probe points away from the sound source.
Figure 4B:
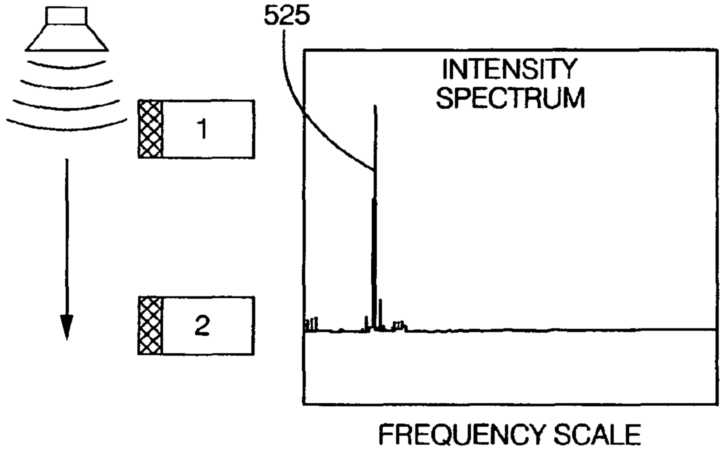
Figure 4C:
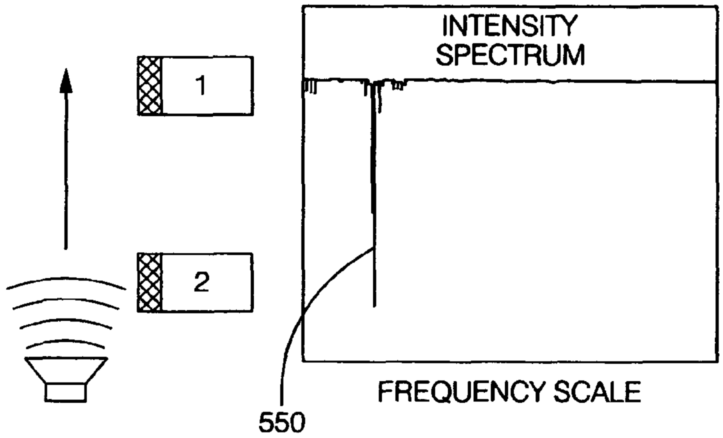

FIG. 4(*a*) is a display showing two superimposed sound-pressure measurements for the pair of microphones 1 and 2. Corresponding sound-intensity spectra are shown in FIGS. 4(*b*) and 4(*c*). The latter figures demonstrate the effect of reversing the direction of the sound produced by a source like a vibrating surface. Positive spectrum 525 occurs when the sound moves from microphone 1 to microphone 2, as though coming out of a vibrating surface. Negative spectrum 550 occurs when the sound moves from microphone 2 to 1, as though entering into the vibrating surface. This feature and the sign of the sound intensity are used by the pairs of microphones to show the direction of sound intensity flow at a vibrating surface. The data in FIG. 4 were computed using LabVIEW, a computer program supplied by the National Instruments Company. Other computer methods could be used.

Figure 5:
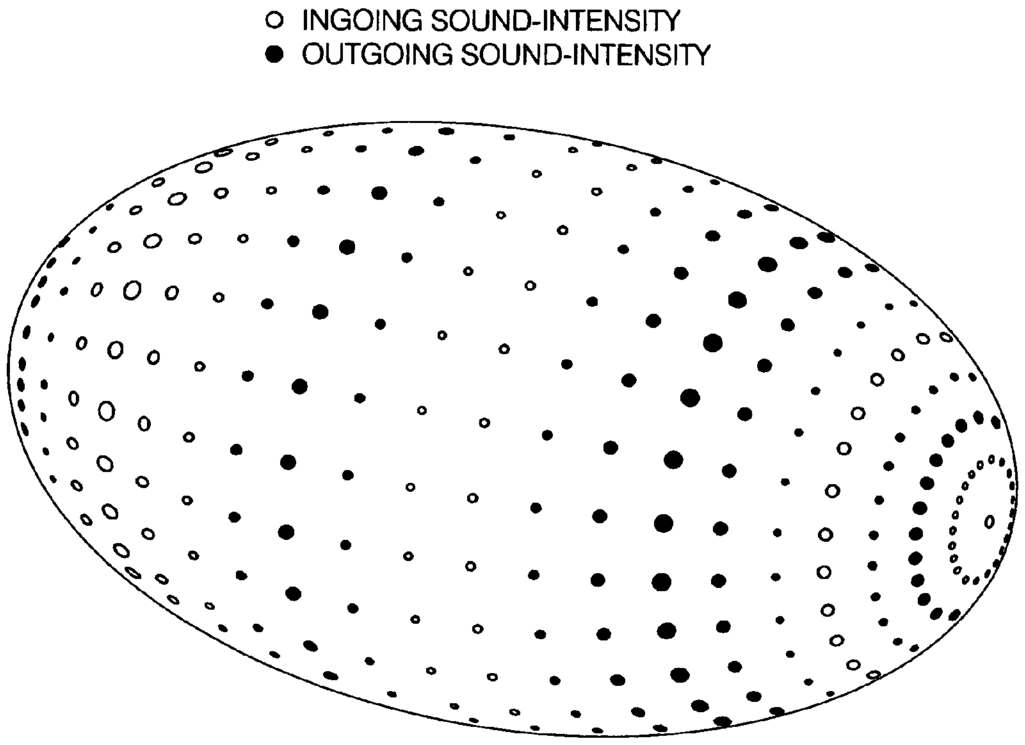
FIG. 5 shows hypothetical sound-intensity measurements at a distribution of points on a vibrating surface where positive sound intensity flows out of the surface at some points and negative sound intensity flows into the surface at other points.

FIG. 5 is a hypothetical representation of sound-intensity measurements at an array of measurement points on a vibrating surface. The measurements are stationary and do not involve space-time averaging with a continuously moving probe (so-called "painting") that is frequently used in prior art. In the figure, sound-intensity amplitude is represented symbolically by different sizes of black and white circles. Solid black circles represent outgoing sound intensity and open circles represent ingoing sound intensity. The sound-intensity amplitude could also be color-coded to form a continuous representation.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims:

I claim:

1. An apparatus for measuring the sound intensity emitted by a vibrating surface, comprising:

a probe having a straight supporting tube with only three microphones attached perpendicularly to the outside of the supporting tube, the microphones being positioned in line, in the side-by side arrangement; wherein said three microphones are labeled respectively with the numbers 1, 2 and 3, starting from the microphone closest to said vibrating surface and moving outward away from the surface; wherein sound pressure is measured using respectively the pair of microphones 1 and 2, or the pair 1 and 3, or the remaining pair 2 and 3; wherein an electronic switch changes sound-pressure measurements back and forth between the microphone pair 1 and 2 and the microphone pair 1 and 3;

instrumentation for amplifying the sound pressure measured by said microphones and for conducting the measurements to a computer;

a computer program for determining sound-intensity spectra and sound intensity using the cross-spectral relation;

a device connected to said computer for displaying sound pressure, sound-intensity spectra and sound intensity.

2. The invention as in claim 1 wherein said straight supporting tube includes three tubes that protrude perpendicularly an equal distance from the side of said supporting tube, said three microphones being located at the distal ends of said tubes.

3. The invention as in claim 2 wherein said tubes contain wires from each of said microphone, the wires from the microphones being combined inside said supporting tube and connected to the instrumentation.

4. The invention as in claim 1 wherein said three microphones are matched in phase and amplitude.

5. The invention as in claim 1 wherein said three microphones lie on a geometric straight line parallel to the axis of said straight supporting tube.

6. The invention as in claim 5 wherein said geometric straight line of the three microphones and said supporting tube are positioned perpendicularly to said vibrating surface.

7. The invention as in claim 6 wherein said geometric straight line of the three microphones can be extended to indicate the position of the measurement point on said vibrating surface.

8. The invention as in claim 1 wherein the spacing between the microphones in each pair corresponds to a desired frequency range.

9. The invention as in claim 1 wherein said computer calculates sound intensity by integrating said sound-intensity spectra over their frequency ranges.

10. The invention as in claim 9 wherein the sign of said sound-intensity spectra and said sound intensity indicates the direction of sound-intensity flow at the vibrating surface.

11. A method for measuring the sound intensity emitted by a vibrating surface, using a probe with a straight supporting tube having only three miniature microphones attached to the side of said supporting tube in the side-by-side arrangement, the microphones forming a straight geometric line parallel to the axis of said supporting tube:

matching said three microphones in phase and amplitude;

positioning the supporting tube of said probe and the geometric line of the attached three microphones perpendicularly to a vibrating surface;

extending said straight geometric line of microphones towards said vibrating surface to indicate the measurement point on the surface;

measuring sound pressure at pairs of said three microphones, the pairs being selected using an electronic switch;

selecting the spacings of said pairs to obtain a desired frequency range for sound-pressure measurement;

amplifying said sound-pressure measurements;

conducting the amplified, sound-pressure measurements to a data-acquisition system and computer;

computing sound-intensity spectra from the sound pressure at said pairs of microphones, using the cross-spectral relation;

integrating the sound-intensity spectra with respect to frequency to obtain the sound intensity for each said pair of microphones;

displaying said sound-pressure measurements together with the sound-intensity spectra and sound intensity;

using the sign of said sound-intensity spectra and sound-intensity to show the direction of sound-intensity flow at the vibrating surface;

representing the distribution of the sound-intensity measurements over a hypothetical grid of points on the vibrating surface.

* * * * *